(12) United States Patent
Soulier et al.

(10) Patent No.: US 10,778,349 B2
(45) Date of Patent: Sep. 15, 2020

(54) RDS DECODER

(71) Applicants: Continental Automotive France, Toulouse (FR); Continental Automotive GmbH, Hannover (DE)

(72) Inventors: Gérald Soulier, Rambouillet (FR); Grégoire Hivert, Boissy le Sec (FR)

(73) Assignees: Continental Automotive France (FR); Continental Automotive GmbH (DE)

( * ) Notice: Subject to any disclaimer, the term of this patent is extended or adjusted under 35 U.S.C. 154(b) by 0 days.

(21) Appl. No.: 16/093,711

(22) PCT Filed: Apr. 18, 2017

(86) PCT No.: PCT/FR2017/050914
§ 371 (c)(1),
(2) Date: Oct. 15, 2018

(87) PCT Pub. No.: WO2017/182750
PCT Pub. Date: Oct. 26, 2017

(65) Prior Publication Data
US 2019/0081717 A1    Mar. 14, 2019

(30) Foreign Application Priority Data
Apr. 18, 2016  (FR) .................................. 16 53412

(51) Int. Cl.
*H04H 40/18*  (2008.01)
*G06F 17/17*  (2006.01)

(52) U.S. Cl.
CPC ............. *H04H 40/18* (2013.01); *G06F 17/17* (2013.01); *H04H 2201/13* (2013.01)

(58) Field of Classification Search
CPC ........ G06F 16/22; G06F 16/328; G06F 17/50; G06F 17/11; G06F 1/1694;
(Continued)

(56) References Cited

U.S. PATENT DOCUMENTS

| | | | |
|---|---|---|---|
| 2010/0293215 A1* | 11/2010 | Szajnowski | G01S 13/34 708/440 |
| 2015/0120987 A1* | 4/2015 | Wheeler | G11C 7/1006 711/102 |
| 2017/0111097 A1* | 4/2017 | Nyenhuis | H04B 7/0632 |

FOREIGN PATENT DOCUMENTS

EP    2372942 A1    10/2011

OTHER PUBLICATIONS

Ford, J., "Simultaneous Digital Demodulations and RDS Extraction of FM Radio Signals", Honor Thesis, Jan. 1, 2011, retrieved from internet: URL:http://digitalcommons.andrews.edu/cgi/viewcontent.cgi?article=1003&context=honors, 14 pages.
(Continued)

*Primary Examiner* — Ajibola A Akinyemi
(74) *Attorney, Agent, or Firm* — RatnerPrestia

(57) ABSTRACT

The invention relates to a method for decoding a received RDS signal (R), comprising the following steps: determining an extreme value from among the absolute values of the RDS signal (R) integrals obtained in an elementary range interval (Te), and sliding from a starting point in at least one slide range (Tg); and extracting a binary pattern "0" if the extreme value is a minimum value, and a binary pattern "1" if the extreme value is a maximum value.

16 Claims, 2 Drawing Sheets

(58) Field of Classification Search
CPC ............ G06F 2217/04; G06F 2217/06; G06F 3/0233; G06F 3/033; G06F 3/0346; G06F 3/03545; G06F 3/04817; G06F 3/04845; G06F 16/137; G06F 16/1744; G06F 16/1748; G06F 16/215
USPC .................................................... 455/185.1
See application file for complete search history.

(56) References Cited

OTHER PUBLICATIONS

International Search Report and Written Opinion for International Application No. PCT/FR2017/050914, dated Jul. 5, 2017, 7 pages.

* cited by examiner

Fig. 3
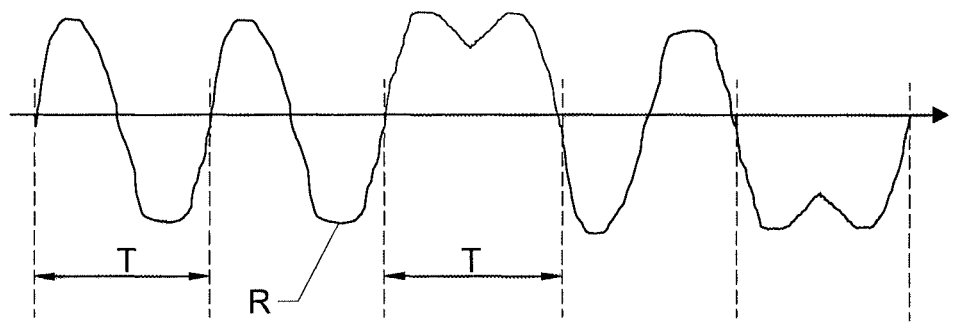
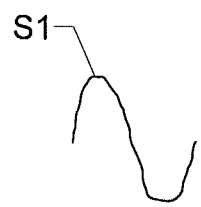
Fig. 4a
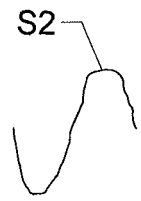
Fig. 4b
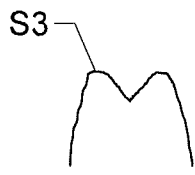
Fig. 4c
Fig. 4d
Fig. 5
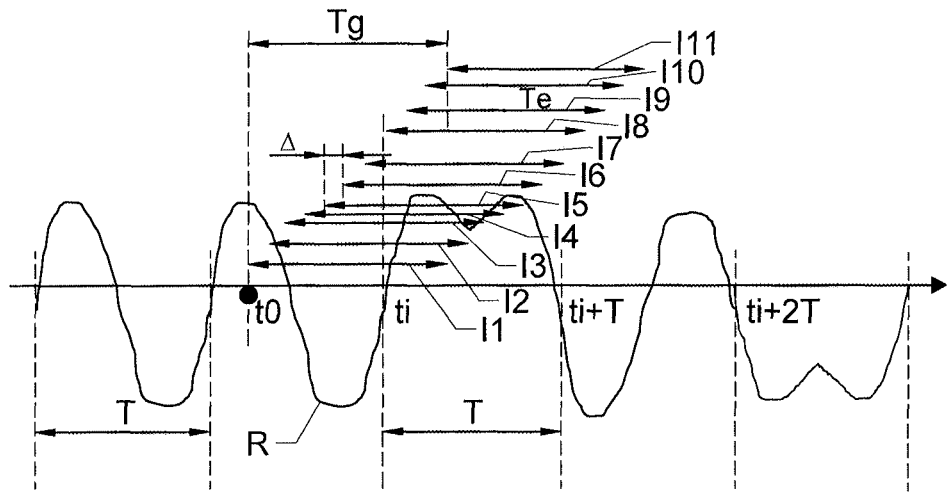

RDS DECODER

CROSS REFERENCE TO RELATED APPLICATIONS

This application is the U.S. National Phase Application of PCT International Application No. PCT/FR2017/050914, filed Apr. 18, 2017, which claims priority to French Patent Application No. 1653412, filed Apr. 18, 2016, the contents of such applications being incorporated by reference herein.

FIELD OF THE INVENTION

The present invention relates to the reception-side decoding of an RDS signal.

BACKGROUND OF THE INVENTION

An RDS signal is a signal coding a binary signal at 1187.5 Hz (comprising 1187.5 binary digits per second). This signal is typically multiplexed with an audio signal containing a radio program to be transmitted at radio frequency for the attention of radio receivers or vehicle radios. This RDS signal allows data such as the name of the radio program, the name of the track played, etc. or even data on the state of road traffic to be transmitted.

RDS signals are defined by standard EN 50067, which is incorporated by reference. The transmission-side processing is functionally described in FIG. 1. The reception-side processing is functionally described in FIG. 2.

SUMMARY OF THE INVENTION

The problem addressed by an aspect of the present invention is that of the processing of the received RDS signal, signal 1 in FIG. 2, to obtain the binary signal 6 of FIG. 2, said binary signal needing to be identical to the transmitted binary signal, signal 1 in FIG. 1.

Standard EN 50067, which dates from 1998, functionally describes a possible processing method based on the (mainly electronic) technical solutions that were available at the time. This method comprises 5 steps: regenerating a data clock frequency from the RDS signal, linear inversion, integration, thresholding, and differential decoding, these steps being substantially the inverse of the processing steps envisioned transmission/coding-side. This method produces four intermediate signals, signals 2-5 in FIG. 2.

This method, even though the standard does not require it to be used, has naturally been adopted by implementers. With the arrival of new technologies, mainly computational technologies (digital signal processors or DSPs), the same method has naturally been transferred to these new technologies, in the form of a DSP software package reproducing these five steps.

Now, it would appear that it is possible to take advantage of these new technologies to drastically simplify the method used to decode RDS signals.

Attentive observation of the received RDS signal shows, such as illustrated in FIG. 3, that it includes four types of different symbols, such as illustrated in FIGS. 4A-4D. Two "uneven" symbols corresponding to a "0" binary digit and two "even" symbols corresponding to a "1" binary digit.

On the basis of this ingenious observation, an aspect of the invention proposes a method, which is no less ingenious, allowing these various symbols to be discriminated in order to extract the "0" or "1" binary digits and thus reconstruct the binary signal.

One subject of an aspect of the invention is a method for reception-side decoding of an RDS signal, comprising the following steps: determining an extremum among the absolute values of the integrals of the RDS signal, said integrals being obtained over an interval of elementary extent, said interval moving from a start point over at least one movement extent; and extracting a "0" binary digit if the extremum is a minimum, and a "1" binary digit if the extremum is a maximum.

The method according to an aspect of the invention thus advantageously allows the five steps of the prior art to be replaced with a step of calculating integrals over a moving interval and a step of searching for extrema among the results. This allows the five steps of the prior art, which are not necessarily optimized for a DSP, to be replaced with two steps implementing operations for which a DSP is particularly well-suited.

An aspect of the invention thus allows an appreciable decrease in the code size of the integrated software package. In addition, an aspect of the invention allows performance to be improved by a factor of at least two.

BRIEF DESCRIPTION OF THE DRAWINGS

The detailed description makes reference to the drawings, in which:

FIG. 3 shows a detail of an RDS signal including five symbols;

FIGS. 4A-4D illustrate the four possible types of symbols; and

FIG. 5 shows the principle allowing a symbol to be synchronized and/or traced, and the various symbols to be discriminated in order to extract the "0" or "1" binary digits.

Figure 1:
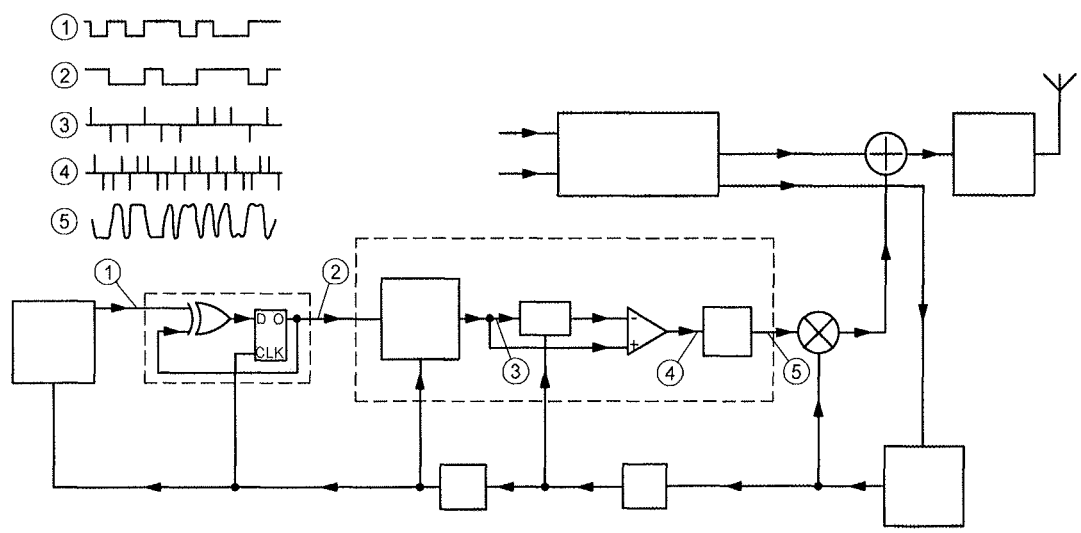
FIG. 1 shows the functional block diagram of transmission-side coding of an RDS signal, such as defined by standard EN 50067.
Figure 2:
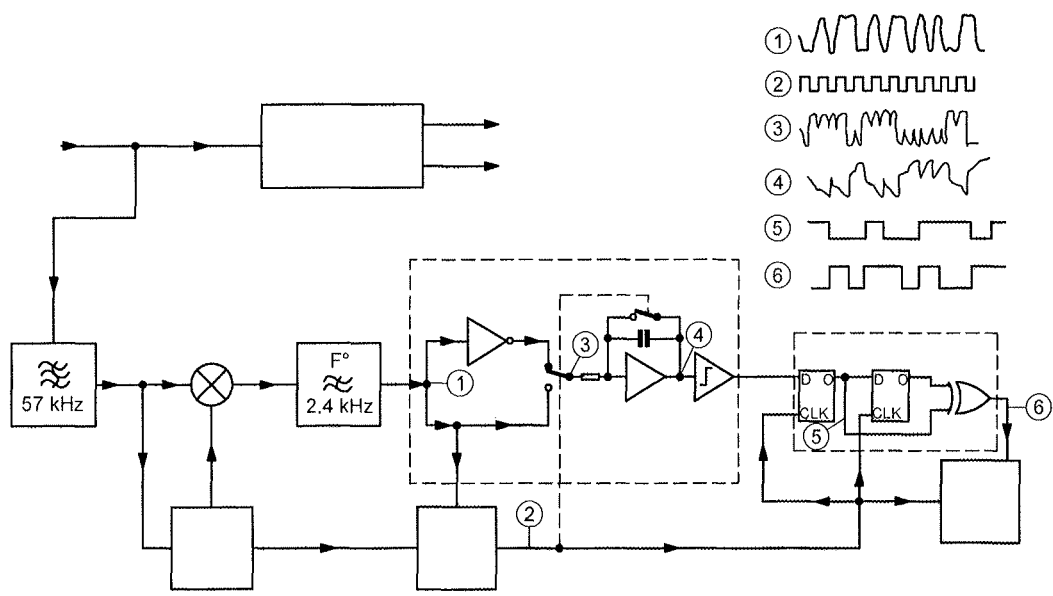
FIG. 2 shows the functional block diagram of reception-side decoding of an RDS signal, such as defined by standard EN 50067.

Other features, details and advantages of aspects of the invention will become more clearly apparent from the detailed description provided below by way of indication.

DETAILED DESCRIPTION OF THE PREFERRED EMBODIMENTS

A receiver initially receives a multiplexed signal, MPX, comprising the audio signal and the RDS signal R. The RDS signal R is initially on a sub-carrier at 57 kHz. The processing operations required to extract the RDS signal R from the signal MPX are assumed to be known and remain identical to those of the prior art.

FIG. 3 illustrates a detail of the RDS signal R, such as obtained after these processing operations. This RDS signal R has a binary-digit frequency of 1187.5 Hz. FIG. 3 shows five successive binary digits, separated by dashed lines. An analysis of the RDS signal R allows it to be seen that this RDS signal R contains only four different types of signals S1-S4, illustrated in FIGS. 4A-4D, respectively. Each symbol corresponds to a binary digit. The two symbols S1 and S2 correspond to a "0" binary digit and are said to be "uneven". The two symbols S3 and S4 correspond to a "1" binary digit and are said to be "even".

The problem addressed by an aspect of the present invention consists in isolating/identifying in the RDS signal R the symbols S1-S4 and in recognizing them. To do this it is necessary, on the one hand, to be able to "synchronize" the RDS signal R by finding the start point ti of at least a first symbol (see FIG. 5) in order to be able to separate two consecutive symbols, and, on the other hand, to be able to determine whether a symbol thus isolated is a symbol of type S1 or S2 or of type S3 or S4.

It may be noted that the two symbols S1, S2 associated with a "0" binary digit have "uneven" shapes in that the functions representing them are uneven, whereas the two symbols S3, S4 associated with a "1" binary digit have "even" shapes in that the functions representing them are even. Advantage is taken of this property by using a property of the integrals of uneven and even functions.

Thus, the integral of a symbol S1 or S2 is zero. The integral of a symbol S3 is positive and equal to a value +X, which may be equal to +1 if the signal is normalized. The integral of a symbol S4 is negative and equal to a value −X, which may be equal to −1 if the signal is normalized. Thus, the absolute value of the integral of a symbol S1 or S2 is zero, whereas the absolute value of the integral of a symbol S3 or S4 is equal to +X.

In addition, with reference to FIG. 5, by calculating the absolute value of the integral of the RDS signal R over an interval I1, of elementary extent Te, from a start point, such as here t0, and by repeating this operation while making said interval move over a movement extent Tg, by replacing the first interval I1 with each of the intervals I2-I11 successively, a series of integral values is obtained. These values have an extremum that it is possible to locate, in time, at the point ti, coinciding with the start of a symbol (and therefore, simultaneously, with the end of an immediately preceding symbol).

If the symbol is of the S1 or S2 type, then the extremum is a minimum and has a value close to 0. The detection of such a minimum is indicative of a "0" binary digit. If in contrast the symbol is of the S3 or S4 type, then the extremum is a maximum and has a value close to +X. The detection of such a maximum is indicative of a "1" binary digit.

It may be noted that the method does not discriminate a symbol S1 from a symbol S2, or a symbol S3 from a symbol S4, but directly allows a "0" binary digit to be discriminated from a "1" binary digit.

In the example of FIG. 5, the extremum is obtained over the interval I7. The detected symbol starts at ti and ends at ti+T. The extremum is a maximum, indicative of a "1" binary digit.

It is possible to discriminate a value +X from a value 0 via a set threshold, for example 0.75×. Alternatively, in order to increase the adaptability of the method, dynamic thresholding may be used.

The elementary extent Te of calculation of an integral is preferably equal to the width of a symbol S1-S4, thus it is set equal to a binary-digit period T. It is important, to be able to compare the integrals with a view to determining the extremum, for all the elementary extents Te of a given calculation over all the intervals I1-I11 of a given moving interval to be equal.

The binary-digit period T may vary slightly over time, in particular because of drift in one of the transmission- or reception-side clocks. According to a first embodiment, this period T is considered to be constant, for example equal to its theoretical average value, i.e. to 1/1187.5=842.105 µs. According to another embodiment, it may be recalculated depending on the binary-digit wavelengths actually observed reception-side, such as those detected between two successive extrema ti+kT and ti+(k+1)T.

The above extremum-search principle thus allows, in one and the same operation, the start Ti of a symbol to be detected and thus a "synchronization" to be carried out automatically, and the type of symbol S1-S4 and therefore the binary digit to be discriminated and its extraction to be carried out.

On start-up of the method, no "synchronization" information is available. Thus, the first start point is arbitrarily chosen, here as t0. This point t0 has little chance of coinciding with a symbol start/end point ti. In order to detect a symbol, as indicated above, each integral is calculated over an elementary extent Te equal to a binary-digit period T. In order to be sure to detect an extremum by calculating one of the integrals substantially over the extent of a symbol, the movement extent Tg must be at least equal, it may be larger, than a binary-digit period T.

A succession of symbols S1 or S2, corresponding to a "0" binary digit, may not provide a clear extremum. A succession of symbols S1/S4 or S2/S3 will in contrast provide a marked extremum that will allow the first detection of a symbol start point and the initial synchronization to be carried out. By the very construction of the RDS signal R, such a succession is guaranteed by the necessary presence of at least one "1" bit in each data block. This guarantees that an initial synchronization may be carried out with a delay of at most 20 ms, this being entirely acceptable.

Once the initial synchronization has been carried out, tracking is carried out as described below. In the case where a clear extremum cannot be obtained, it is possible to consider a symbol that is a "multiple" of a preceding symbol. A new synchronization may be carried out once a notable extremum is detectable. The construction of the RDS signal R guarantees the regular presence of a notable extremum.

In order to be able to be processed by a DSP, the RDS signal R must be digitized beforehand, typically at a sampling frequency Fe. By way of indication, for digital applications, a frequency Fe may be equal to 48 kHz. A binary-digit period T is covered by a number T×Fe of samples that is not necessarily an integer. It is therefore recommendable, to carry out the calculations, to use an immediately higher integer number of samples. With the illustrative numerical values, T×Fe=40.42104, 41 samples will thus be used to cover a period T.

In order to make the interval of calculation of the integrals move, an increment Δ between two calculations is used. This increment Δ may be of any size. It must however be sufficiently small to allow a detection of extrema. Advantageously, this increment Δ comprises an integer number of samples. This number of samples is a compromise between precision and computational load. Thus an integral calculation for each sample is possible and provides the maximum precision. A calculation every 2, 3 or more samples is also possible and allows computational load to be decreased accordingly.

After a first extremum has been determined, a symbol start point ti is known and a symbol comprised between ti and ti+T is extracted. It is then possible for the m following symbols to consider that the synchronization has been acquired, and that the m following symbols are successively located between two successive "multiples" of the point ti, i.e. between ti+kT and ti+(k+1)T, with k comprised between 1 and m, respectively. If the problem of determining the synchronization is thus excluded, the extracting step boils down to a single calculation of an absolute value of an integral of the RDS signal R for each of the m symbols, over the interval [ti+kT, ti+(k+1)T]. If the obtained value is close to 0, the symbol, over this interval, corresponds to a "0" digit. If the obtained value is not close to 0, in that it is close to +X, the symbol over this interval corresponds to a "1" digit.

It will be noted that the expression "close to 0" is understood to mean a value lower than 10% of the maximum detected value and the expression "is not close to 0" is understood to mean a value higher than 90% of the maximum value.

With the preceding option, computational load decreases as m increases. m is chosen to be all the higher as the stability and/or synchronicity of the clocks increases. In contrast, if the clocks are not very stable, it is possible to consider m=0.

The preceding option may advantageously be applied in the case of absence of notable extremum or of difficulty in determining an extremum, in the tracking phase.

At the end of the preceding m "simplified" extractions, a new synchronization (or tracking phase) is considered to be necessary and/or possible.

To carry it out, the principle used above is reused. The two steps, of determining an extremum and of extracting a binary digit, are repeated, substantially identically so as to determine an extremum and to extract the associated binary digit. Advantage is however taken of the fact that a synchronization has already been carried out and that at least one extremum ti has been determined. Thus the start point considered for the moving interval is set equal to the last symbol-limit point ti, i.e. to the point ti at which an extremum was determined or one of its "multiples". Advantageously, the last multiple point is used, i.e. the point ti+(m+1)T.

The elementary extents Te remain identical, and substantially equal to a binary-digit period T.

According to a first embodiment, the movement extent Tg also remains substantially equal to a binary-digit period T.

According to a safer second embodiment, the start point considered for the moving interval is set to the last symbol-limit point ti but with anticipation by a temporal margin E, i.e. advantageously to the last multiple point anticipated by a temporal margin ε, namely the point ti+(m+1)T−ε. The idea is to anticipate slightly, in order not to "miss" a symbol (start point). Thus, all that is required is a temporal margin E equal to a small fraction of a period T. A temporal margin ε that is an integer multiple of a sample is advantageous. 1 or 2 samples are a sufficient temporal margin ε.

In this second embodiment, the elementary extents Te remain identical, and substantially equal to a binary-digit period T. In order to be sure to entirely cover a symbol and to correctly detect an extremum, the movement extent Tg is advantageously prolonged by two times the temporal margin ε, i.e. Tg=T+2ε.

A checking step may optionally be applied. This step carries out a correlation of the RDS signal R over a first interval corresponding to a binary digit, i.e. between a point ti at which an extremum has been determined and a point ti+T distant by a binary-digit period T, with the RDS signal R over a second interval corresponding to an immediately preceding binary digit, i.e. between a point ti −T preceding said point ti by a binary-digit period T, and said point ti.

This operation requires knowledge of the symbol start and end points and can be carried out only after a successful synchronization.

The aim of this correlation is to "reinforce" the value of a symbol. The integral of the correlated signal over the correlation interval gets close to 0, and then in practice to a minimum, if the binary digit is different from the immediately preceding binary digit, and gets close to 1, and then in practice to a maximum, if the two binary digits are identical.

The expression "gets close to 0" is understood here to mean that the value of the integral is lower than 10% of the maximum value and the expression "gets close to 1" is understood to mean that the value of the integral is higher than 90% of the maximum value.

Thus, knowledge of the "0" or "1" absolute state of a first binary digit, achieved by any method, allows, using the successive "differentials" obtained after correlation, the respective states of all the following binary digits to be determined.

These "absolute" states and/or the "relative" differentials may be used to confirm the binary digit extracted using the method described above.

Alternatively, they may be used to detect and/or locate errors of the decoding method.

An aspect of the invention also relates to a device carrying out a method according to any one of the preceding embodiments.

The invention claimed is:

1. A method for reception-side decoding of an RDS signal, comprising:
    integrating the RDS signal N times to obtain N integrals, each of the N integrals having an interval equal to a binary digit period, each of the N intervals being shifted in time with respect to each other such that the N intervals partially overlap each other in time and extend over a time period that is larger than or equal to the binary digit period;
    determining an extremum among absolute values of the N integrals of the RDS signal; and
    extracting a "0" binary digit if the extremum is a minimum, and a "1" binary digit if the extremum is a maximum.

2. The method as claimed in claim 1, wherein the first start point is an arbitrary point, and wherein the movement extent is equal to a binary digit period.

3. The method as claimed in claim 2, comprising, following the determination of an extremum, repeating the steps of determining an extremum and of extracting a binary digit with a start point equal to an end point of the last extracted digit, said point being a multiple of a point at which an extremum has been determined, with an elementary extent substantially equal to a binary digit period, and with a movement extent substantially equal to a binary digit period.

4. The method as claimed in claim 2, comprising, following the determination of an extremum, repeating the steps of determining an extremum and of extracting a binary digit with a start point equal to an end point of the last extracted digit, said point being anticipated by a temporal margin, with an elementary extent substantially equal to a binary digit period, and with a movement extent substantially equal to a binary digit period increased by two times the temporal margin.

5. The method as claimed in claim 2, additionally comprising, following the determination of an extremum, the steps of:
    correlating the RDS signal over a first interval corresponding to a binary digit, with the RDS signal over a second interval corresponding to an immediately preceding binary digit;
    integrating the correlated signal over the first interval; and
    obtaining a binary digit different from the immediately preceding binary digit if the integral is lower than 10% of the maximum value, and a binary digit identical to the immediately preceding binary digit if the integral is higher than 90% of the maximum value.

6. The method as claimed in claim 1, wherein following the determination of an extremum, a number m of binary digits is extracted via the following steps:
   calculating absolute values of the integrals of the RDS signal, said integrals being obtained over m intervals starting at m "multiple" points of a point at which an extremum has been detected, i.e. at ti+kT, with k an integer varying from 1 to m, said intervals being of extent substantially equal to a binary digit period; and
   extracting a "0" digit if the absolute value of the integral is lower than 10% of the maximum value, and a "1" digit if the absolute value of the integral is higher than 90% of the maximum value.

7. The method as claimed in claim 6, comprising, following the determination of an extremum, repeating the steps of determining an extremum and of extracting a binary digit with a start point equal to an end point of the last extracted digit, said point being a multiple of a point at which an extremum has been determined, with an elementary extent substantially equal to a binary digit period, and with a movement extent substantially equal to a binary digit period.

8. The method as claimed in claim 6, comprising, following the determination of an extremum, repeating the steps of determining an extremum and of extracting a binary digit with a start point equal to an end point of the last extracted digit, said point being anticipated by a temporal margin, with an elementary extent substantially equal to a binary digit period, and with a movement extent substantially equal to a binary digit period increased by two times the temporal margin.

9. The method as claimed in claim 6, additionally comprising, following the determination of an extremum, the steps of:
   correlating the RDS signal over a first interval corresponding to a binary digit, with the RDS signal over a second interval corresponding to an immediately preceding binary digit;
   integrating the correlated signal over the first interval; and
   obtaining a binary digit different from the immediately preceding binary digit if the integral is lower than 10% of the maximum value, and a binary digit identical to the immediately preceding binary digit if the integral is higher than 90% of the maximum value.

10. The method as claimed in claim 1, comprising, following the determination of an extremum, repeating the steps of determining an extremum and of extracting a binary digit with a start point equal to an end point of the last extracted digit, said point being a multiple of a point at which an extremum has been determined, with an elementary extent substantially equal to a binary digit period, and with a movement extent substantially equal to a binary digit period.

11. The method as claimed in claim 10, additionally comprising, following the determination of an extremum, the steps of:
   correlating the RDS signal over a first interval corresponding to a binary digit, with the RDS signal over a second interval corresponding to an immediately preceding binary digit;
   integrating the correlated signal over the first interval; and
   obtaining a binary digit different from the immediately preceding binary digit if the integral is lower than 10% of the maximum value, and a binary digit identical to the immediately preceding binary digit if the integral is higher than 90% of the maximum value.

12. The method as claimed in claim 1, comprising, following the determination of an extremum, repeating the steps of determining an extremum and of extracting a binary digit with a start point equal to an end point of the last extracted digit, said point being anticipated by a temporal margin, with an elementary extent substantially equal to a binary digit period, and with a movement extent substantially equal to a binary digit period increased by two times the temporal margin.

13. The method as claimed in claim 12, additionally comprising, following the determination of an extremum, the steps of:
   correlating the RDS signal over a first interval corresponding to a binary digit, with the RDS signal over a second interval corresponding to an immediately preceding binary digit;
   integrating the correlated signal over the first interval; and
   obtaining a binary digit different from the immediately preceding binary digit if the integral is lower than 10% of the maximum value, and a binary digit identical to the immediately preceding binary digit if the integral is higher than 90% of the maximum value.

14. The method as claimed in claim 1, additionally comprising, following the determination of an extremum, the steps of:
   correlating the RDS signal over a first interval corresponding to a binary digit, with the RDS signal over a second interval corresponding to an immediately preceding binary digit;
   integrating the correlated signal over the first interval; and
   obtaining a binary digit different from the immediately preceding binary digit if the integral is lower than 10% of the maximum value, and a binary digit identical to the immediately preceding binary digit if the integral is higher than 90% of the maximum value.

15. The method as claimed in claim 14, wherein the binary digit obtained is compared with the extracted binary digit, in order to provide a way of detecting and/or locating errors.

16. A device implementing a method as claimed in claim 1.

* * * * *